Jan. 12, 1943.   R. M. ROWELL   2,308,341
LONG SCALE FREQUENCY METER
Filed Jan. 24, 1941

Inventor:
Ralph M. Rowell,
by Harry E. Dunham
His Attorney.

Patented Jan. 12, 1943

2,308,341

UNITED STATES PATENT OFFICE 2,308,341

LONG SCALE FREQUENCY METER

Ralph M. Rowell, Lynn, Mass., assignor to General Electric Company, a corporation of New York Application January 24, 1941, Serial No. 375,831

1 Claim. (Cl. 171—95)

My invention relates to electrical measuring and indicating instruments and concerns particularly instruments which are responsive to frequency of alternating current circuits.

It is an object of my invention to provide a highly efficient, positively acting frequency meter having a long scale exceeding 250 degrees and approaching 270 degrees in angular length.

Another object of my invention is to provide an improved frequency measuring device of the dynamometer type.

It is still another object of my invention to provide frequency responsive apparatus which may be manufactured conveniently and relatively inexpensively and in which the necessity for tapered air gaps may be avoided. Other and further objects and advantages will become apparent as the description proceeds.

In carrying out my invention in its preferred form I utilize a pair of resonant circuits of the conventional type tuned to frequencies above and below the range of frequencies which are to be measured by the instrument. A two-circuit current-responsive instrument mechanism is employed which is so connected to the resonant circuits that the currents in one resonant circuit act in opposition to those in the other resonant circuit and the resultant action of the instrument mechanism depends upon the relationship between the currents in the resonant circuits, and, therefore, upon the magnitude of the frequency. I utilize a torque-producing or principal instrument unit which is of the long range dynamometer type, preferably exceeding 250 degrees in angular range and has a pair of field coils or a field coil with a center tap for connection to the resonant circuits. For producing restraining torque without tendency toward instability near the ends of the scale and for providing linear scale distribution, I provide an auxiliary instrument element which is of the modified repulsion-vane type.

Figure 1:
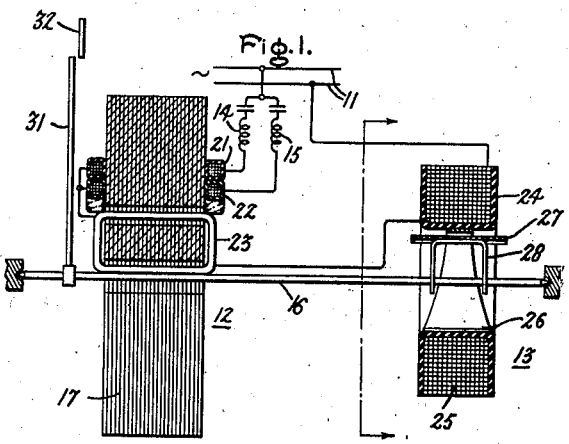
Figure 2:
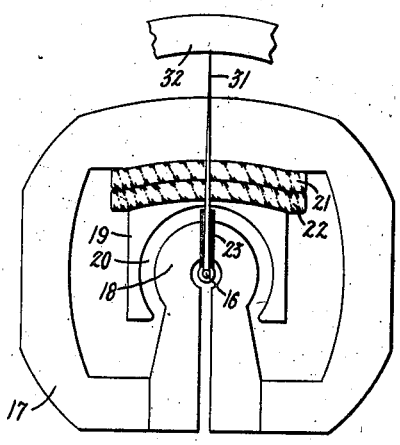
Figure 3:
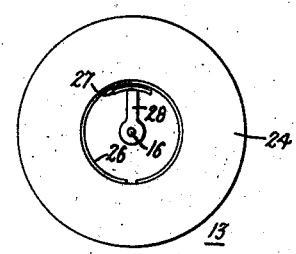
Figure 4:
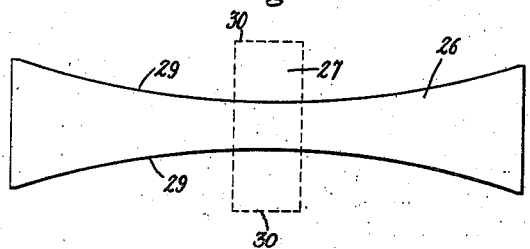

The invention may be understood more readily from the following detailed description, when considered in connection with the accompanying drawing, and those features of the invention which are believed to be novel and patentable will be pointed out in the claim appended hereto. In the drawing Fig. 1 is a diagrammatic representation partially in longitudinal vertical section of one embodiment of my invention; Fig. 2 is a front view of the apparatus of Fig. 1 showing the principal instrument unit; Fig. 3 is a front view of the restraining torque-producing unit of the arrangement of Fig. 1; and Fig. 4 is a development of the stationary iron of the restraining torque unit shown in Fig. 3 with the development of the movable vane shown in dashed lines.

Referring now more in particular to Fig. 1 which illustrates an arrangement for measuring the frequency of an alternating current circuit represented by a pair of conductors 11, I provide a principal or torque-producing instrument unit 12 and an auxiliary or restraining-torque-producing instrument unit 13. A pair of branch circuits 14 and 15 differing in frequency-response characteristics is also provided which partially include the windings of the instrument units 12 and 13. For example, the circuits may include in one case a resistance and in the other a reactance, or for a smaller range, in one case a reactance and in the other a resonant or tuned circuit. For a relatively small scale range, such as 55—65 cycles, preferably both circuits 14 and 15 are resonant as illustrated. The instruments 12 and 13 each contain stationary elements and rotatable elements, which latter are carried by a shaft 16, which is rotatably mounted. The instrument unit 12 is of the long scale type having an angular range preferably exceeding 250 degrees and as much as 270 degrees in length. The instrument unit 12 may be of the iron core dynamometer type such as disclosed, for example, in Patent No. 2,218,376, granted to Almon J. Corson, October 15, 1940, and assigned to the same assignee as the present application. Instruments of this type comprise a core 17 of suitable permeable magnetic material, such as soft iron, or a suitable alloy such as 78.5% Ni and iron arranged to provide a complete magnetic circuit including an inner annular pole piece 18 and an outer pole piece 19 having a cylindrical face or inner surface surrounding so far as possible the inner annular pole piece 18 and spaced therefrom to form an annular air gap 20. The outer pole piece 19 or some other suitable portion of the magnetic field structure is adapted to carry a stationary current conducting winding structure, consisting in this case of a pair of coils 21 and 22. The inner annular pole piece 18 is made coaxial with the shaft 16 and a movable winding is provided in the form of a coil 23 linking the annular pole piece 18 and supported on one side by the shaft 16 so that the coil 23 is movable along the pole piece 18 with one edge sweeping through the air gap 20. The air gap 20 may be and preferably is of uniform length in order to give the instrument unit 12 a uniform scale law. This considerably simplifies the process of manufacture of the instrument unit 12 as compared with tapered air gap frequency measuring instruments of the ratio type utilizing the principle of comparison of currents in resonant circuits tuned to different frequencies. The instrument unit 12 may, in fact, be in all respects similar to a long scale dynamometer type watt meter or voltmeter except for the fact that the stationary winding structure has a mid tap or is divided into two parts consisting of the coils 21 and 22 in order to obtain a two-circuit arrangement. The stationary coils 21 and 22 are connected in series with the resonant circuit elements 14 and 15 respectively, and the series multiple combination as a unit is connected in series with the movable winding 23 and the instrument unit 13 to the conductors of the alternating current circuit 11 in which the frequency is to be measured.

The resonant circuit elements 14 and 15 may consist of inductance and capacitance in series in the customary manner and need not be described in detail. In accordance with the usual practice in frequency meters of the balanced resonant-circuit type one of the resonant circuits is tuned to a frequency above the range of frequencies to be measured and the other resonant circuit is tuned to a frequency below the range of frequencies to be measured, and the divided coils 21 and 22 of the instrument are so connected that they act in opposition, with the current in one tending to drive the instrument down scale and the current in the other tendency to drive the instrument up scale.

The restraining torque unit 13 resembles a repulsion vane type current responsive instrument. This form of restraining torque unit overcomes tendency to instability at the ends of the scale or limits of the angular deflection of the instrument. This restraining torque unit 13 comprises a spool 24 on which is wound a coil of wire 25 forming the operating winding of the instrument 13. The spool 24 is arranged substantially concentric with the shaft 16. Along the inner surface of the spool 24, there is a so-called stationary iron or magnetizable sheet 26, a developed view of which is shown in Fig. 4. The circumferential length of the sheet iron member 26 is slightly less than the inner circumference of the spool 24 and the width of the sheet 26 increases towards the ends as shown by the drawing. Secured to the rotatable shaft 16 is a movable vane 27 carried by suitable arms 28 so that the vane 27 moves adjacent to the surface of the stationary iron 26 as the shaft 16 rotates. The members 26 and 27 may be composed of suitable material such as cold rolled steel or a nickel iron alloy comprising 78½ per cent nickel. The length of the vane 27 in a direction parallel to the instrument shaft 16 is of approximately the same order of magnitude as the maximum dimension of the stationary iron 26 in a direction parallel to the instrument shaft. The angular positions in which the members 26 and 27 are mounted are such that, when the movable coil 23 of the torque-producing instrument 12 is approximately in its mid position as represented in Fig. 2, the movable vane 27 will also be in the mid position with respect to the ends of the stationary iron 26 as represented in Figs. 3 and 4. The shape of the curved edges 29 of the stationary iron 26 is so selected as to make the rate of change with angular deflection of the distance between the ends 30 of the vane 27 and the adjacent portions of the edges 29 of the stationary iron 26 approximately constant throughout the angular length of the stationary iron 26. This is done in order that the torque exerted upon the movable vane 27 by the magnetic repulsion between the stationary iron and the movable vane will increase substantially linearly as the shaft 16 is deflected in either direction from the mid position to which reference has been made, thus producing a linear scale, that is, one in which the frequency subdivisions are substantially the same distance apart all along the scale plate 32.

It will be understood that, as variations in frequency take place in the voltage of the alternating current circuit 11, the relative impedances of the parallel circuits through the inductances 14 and 15 will be varied so as to vary the relative strengths of the magnetomotive forces of the stationary coils 21 and 22 of the principal instrument unit 12. Inasmuch as the impedance is a linear function of frequency, the reaction of each of the coils 21 and 22 on the coil 23 varies linearly with frequency. Since the coils 21 and 22 act in opposition there is a frequency, determined by the dimensions of the parallel circuits, at which the effects of the coils 21 and 22 balance and no torque is exerted by the unit 12. This value of frequency is made such as to be at the mid point of the scale 32 of the instrument, to which the restraining torque unit 13 tends to deflect the pointer 31. As the frequency rises or falls from this intermediate value, the torque exerted upon the coil 23 increases linearly and causes the pointer to deflect linearly with variations in frequency, so that a substantially linear calibration may be employed for the scale 32. This results in ease of calibration, and produces a scale of good appearance, which is easily read with accuracy.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Leters Patent of the United States is:

A restraining torque unit for a long scale measuring instrument having a rotatable deflecting element with substantially zero torque at the mid scale position, said restraining torque unit comprising an instrument unit of the repulsion vane type having a stationary current-conducting coil and a pair of relatively movable magnetic vanes one of which lies along a cylindrical surface and increases in its dimensions parallel to the cylinder axis in either angular direction from its middle, the other of which vanes extends parallel to said axis but is offset therefrom and lies in proximity to said cylindrical surface, the rate of change of said dimension being such as to make the repulsion force between the two vanes substantially linear with respect to angular deflection whereby the repulsion torque unit tends to return to the position with the offset vane at the middle of said cylindrical surface vane whether deflected in one direction or the other therefrom.

RALPH M. ROWELL.